United States Patent [19]

van Basshuysen et al.

[11] 4,427,150
[45] Jan. 24, 1984

[54] MOTOR VEHICLE WITH A COMBUSTION ENGINE

[75] Inventors: Richard van Basshuysen, Heilbronn-Biberach; Dietrich Schmidt, Bönnigheim; Max Ruf, Obereisesheim, all of Fed. Rep. of Germany

[73] Assignee: Audi NSU Auto Union Aktiengesellschaft, Fed. Rep. of Germany

[21] Appl. No.: 324,934

[22] Filed: Nov. 25, 1981

[30] Foreign Application Priority Data

Nov. 26, 1980 [DE] Fed. Rep. of Germany ....... 3044422

[51] Int. Cl.³ ..................... G05D 23/00; F02N 17/02
[52] U.S. Cl. ............................... 237/2 A; 237/12.3 B; 123/142.5 E; 310/58
[58] Field of Search ............. 237/12.3 B, 2 A, 12.3 A; 123/142.5, 142.5 E, 41.31; 310/53, 54, 63

[56] References Cited

U.S. PATENT DOCUMENTS

| 1,852,798 | 4/1932 | Brandenstein | 123/142.5 E |
| 2,541,227 | 2/1951 | Findley | 123/142.5 E |
| 2,749,049 | 6/1956 | Smith | 237/8 |

Primary Examiner—William E. Wayner
Attorney, Agent, or Firm—Kane, Dalsimer, Kane, Sullivan and Kurucz

[57] ABSTRACT

A motor vehicle provided with a combustion engine, an alternator, a battery and a heating installation for the passenger cabin has a heating unit which comprises a heating circuit and a heating exchanger fed by the heating liquid for the heating of air. The alternator is liquid cooled and has a rotor and chambers adapted to receive cooling liquid and is switchable into the heating circuit; and the alternator has filed coils adapted to be short circuited. In this fashion the alternator is switchable as an eddy current brake. Furthermore, the alternator may be a liquid cooled alternator asynchronous generator, whereby its chambers which are cooled by the cooling liquid are switched to the heating circuit.

12 Claims, 5 Drawing Figures

MOTOR VEHICLE WITH A COMBUSTION ENGINE

BACKGROUND OF THE INVENTION

In motor vehicles with a combustion engine the heater operates sufficiently as long as the quantity of heat emitted by the combustion engine is sufficient to heat the heater. However, in combustion engines having a high degree of efficiency and favorable fuel consumption behavior and thereby by the emitted heat of the combustion engine very often is not sufficient. This is particularly the case during idling and in the lower partial load range so that insufficient heat capacity for the heater noticeable ensues, particularly in lower ambient temperatures and accordingly adequate heating of the passenger cabin cannot be assured. In order to remedy this drawback, auxiliary heaters have been proposed which supplement the heating capacitor of the heater to the desired level. These auxiliary heaters operate, for example, with a fuel burner or they are operated with an electric eddy current brake.

In U.S. Pat. No. 2,749,049, wherein an eddy current brake is provided in the heating circuit which serves as a temporary auxiliary heater for the heating liquid and which is designed as an additional unit with its own drive. With such a heater, it is possible to additionally heat the heating liquid for heating purposes. However, a considerable space in the motor vehicle or on the combustion engine is required for mounting this type of heating installation

SUMMARY OF THE INVENTION

It is therefore an object of the invention to eliminate the aforementioned disadvantages and to provide a heater which permits additional heating of the heating liquid at low ambient temperatures.

This, and other objects of the invention is attained by having the alternator cooled by means of liquid; and its parts to which the cooling liquid are admitted are switchable in the heating circuit and that its stator or field windings, respectfully, are short circuited.

In this fashion, the alternator is switchable as an eddy current brake, and, consequently, particularly compact structure is obtained having low space requirements for which one single common drive is sufficient. The particular advantage of this embodiment resides either in the electrical energy being delivered by the alternator or the operation of an eddy current results in generated heat which is transmitted directly into the cooling liquid which encompasses the generator. The generator itself can be loaded to a higher capacity as a result of this cooling, whereby the heat generated by the generator is also good for the cooling liquid cycle. Consequently, the possibility exists in incorporating the generator within the combustion engine.

In accordance with another embodiment of the invention, the alternator is a liquid cooled alternator asynchronous generator, whereby its chambers are cooled by the cooling liquid and are switched to the heating circuit. A semi-conductor circuit is provided for generating from the vehicle battery the exciting current for coils of the alternator synchronous generator. This circuit is provided with two oppositely operating semiconductor circuits per coil of which the first semiconductor is disposed between the coil and the mass, whereby selectively the control current for the two semiconductor circuits is provided by an alternating circuit associated with each coil. The control current is generated from the battery direct current flow by an oscillator. A separator is switched thereafter for generating at least three electric control voltages, one for each coil, which are electrically offset by about 120°, so that the first semiconductor circuit and the second semiconductor circuit are alternating conductive and nonconductive, alternatively, the control current for the first semiconductor circuit may be a direct current, if need be, a cycled direct current of a high frequency, while the control current for the second semiconductor current is zero, so that all first semiconductor circuits are conductive and all second semiconductor circuits are non-conductive, or that at least two of the first semiconductors and at least one of the second semiconductors are conductive. Thus, it is possible that the windings or the coils of the rotary current-asynchronous generator may be used for generating eddy currents or rotating currents for the heating operation. In addition, such a solution permits the linkage of the winding strands in a star as well as a triangular circuit.

In accordance with a further embodiment of the invention, the alternator is a liquid cooled alternator asynchronous generator, the chambers of which admit the cooling liquid are switchable into the heating circuit. A semiconductor circuit for generating the exciting current from the vehicle battery for the coils of the alternator-asynchronous generator is provided which includes two opposite operating semiconductors per coil, whereby one is disposed between the coil and the positive pole and the other is disposed between the coil and the mass. The control current for the semiconductor is an alternating current which is provided from the battery direct current by means of an oscillator with a separator switched thereafter for generating of at least three control voltages which are electrically offset by about 120° for each coil. In this fashion the two semiconductor circuits associated with one each coil are alternately conductive and non-conductive, and that the connections of two coils are switchable for the purpose of reversing the rotating field. In this embodiment eddy currents are also generated by reversing the poles of the rotating current field of the rotating current-asynchronous generator which cause heating of the cooling liquid.

The structural elements of the rotating current generator which guide the magnetic field lines consists of ferromagnetic materials which have the characteristic of operating with small losses even at high frequencies. Use of these materials permit the structural size of the generator and thereby its weight as well as the flywheel action to be reduced.

Normally, the cooling cycle of the combustion engine can be switched to the heating cycle of the combustion engine in a motor vehicle with a liquid cooled combustion engine. Preferably, the pump wheel for feeding the liquid through the heating cycle is mounted on the rotor of the rotating current generator and may also be used for feeding the liquid through the cooling cycle of the combustion engine. When the rotating current generator is switched to an eddy current brake, a corresponding load is transmitted to the combustion engine which results in more rapid heating of the combustion engine. In this manner, the rotating current generator must operate as a current eddy brake, but only for a relatively short time, as long as a heat deficit is present.

It had been also been found to be advantageous to use VMOS-transistors in the semiconductor circuit. Such transistors are characterized by a favorable resistance, a better amplification capacity, shorter switch on and off times, as well as a larger overchargeability.

The coils of the rotating current generator may be switched accordingly for generating the eddy currents when the current circuit which is fed through the ignition switch is closed. When this occurs a first switch is closed at a low outer temperature, a third switch is closed at partial load of the combustion engine, a fourth switch is closed at a low number of rotations, a fifth switch is closed at low gear of the gear drive, a sixth switch is closed during any heat requirement in the passenger cabin, and a seventh switch is closed during insufficient emission at a certain capacity of the battery. This means that the eddy current brake and thereby the auxilliary heater has to be actuated for emitting heat to the heating installation only when all of these operating conditions are present. If one of these operating conditions is not fullfilled or not achieved, the eddy current brake is deactivated and no additional heat is generated.

The first switch may be connected with a temperature sensor which senses the outer temperature, the second switch is connected with a temperature sensor on the combustion engine, the third switch is connected with the gas rod system for the combustion engine, the fifth switch is connected with the switch gear and the seventh switch is connected with the battery.

The first switch may be connected with a temperature sensor which senses the outer temperature, the second switch is connected with a temperature sensor on the combustion engine, the third switch is connected with the gas rod system for the combustion engine, the fifth switch is connected with the switch gear and the seventh switch is connected with the battery.

In a motor vehicle with certain ignited combustion engine the fourth switch is in connection with the current breaker for monitoring the number of revolutions.

In contrast thereto, if a motor vehicle has a self igniting combustion engine, the fourth switch is connected with the injection pump for monitoring the number of revolutions.

For reliable operation, it is advantageous that the switches are actuated by electro-magnets.

In the following, an exemplary embodiment of the invention is explained in more detail in conjunction with the drawings.

In the Drawings

Figure 1:
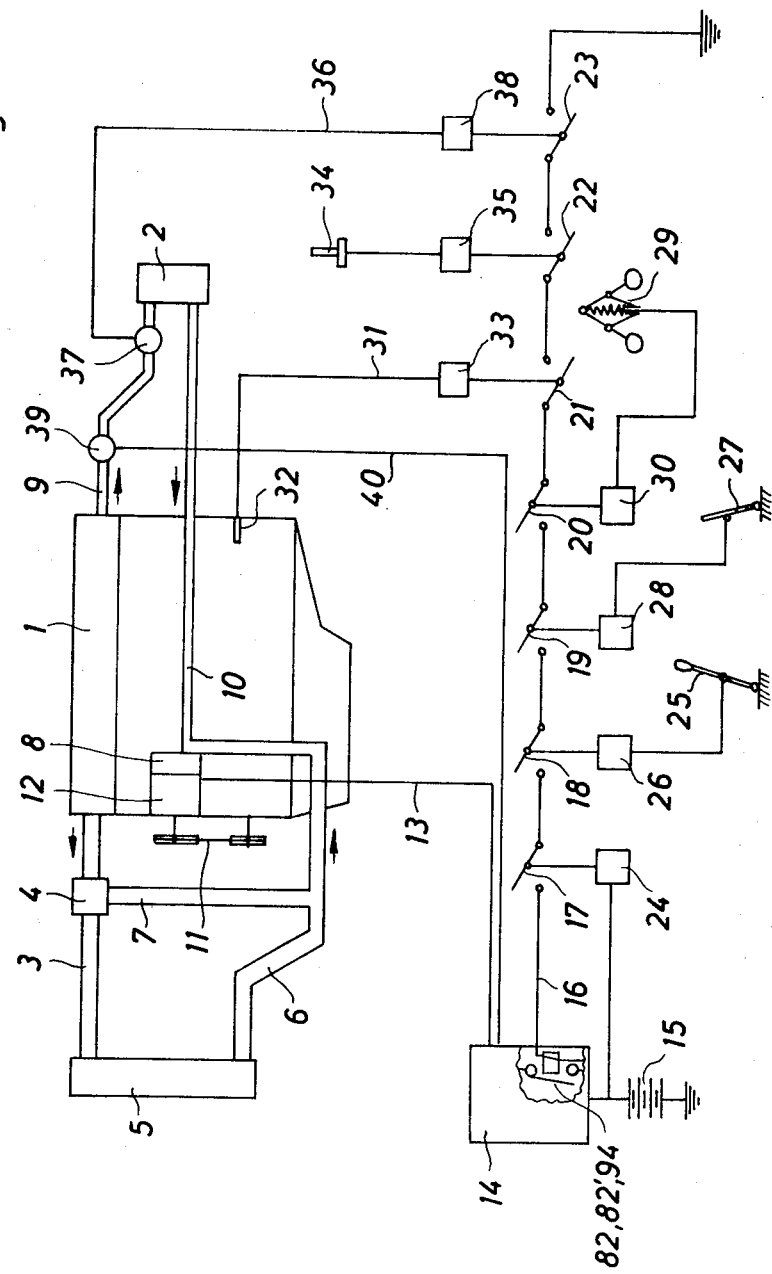
FIG. 1 is a schematic view of a combustion engine of a motor vehicle with a cooling liquid and heating liquid cycle, as well as an associated control.

In the schematic overall view of FIG. 1, a liquid cooled combustion engine 1 is shown of a motor vehicle (not shown), the passenger cabin of which is provided with a heating installation. The heating installation is formed by an air-water-heat exchanger 2 which is connected to the cooling liquid cycle of the combustion engine 1 by means of a heating cycle. This cooling liquid cycle essentially consists of a cooling liquid line 3 which extends from the combustion engine 1 and is guided through a thermostat valve 4 and discharges into a radiator 5. Adjacent to radiator 5 is a cooling liquid line 6 which is connected with a bypass line 7 which exists from the thermostat valve 4 and bypasses the radiator 5 and discharges into a cooling liquid pump 8. This pump circulates the cooling liquid through the cooling spaces of the combustion engine 1 and the heating cycle of the heat exchanger 2. The heat exchanger 2 is connected with the cooling liquid cycle of the combustion engine 1 by means of a supply line 9 extending from the combustion engine 1 and a return line 10. Line 10 is connected with the cooling liquid line 6, thus forming a heating cycle. The cooling liquid is fed immediately into the combustion engine 1 from the cooling liquid pump 8 which is disposed directly on the combustion engine 1 and which is driven thereby by means of a gear belt 11.

The cooling liquid pump 8 and the rotating currentasynchronous generator 12 form one structural unit and the generator 12 is so designed that its coils and rotor are immersed in the cooling liquid. The field coils of the generator 12 are connected with a power source or a battery 15 by means of a line 13 and a control device 14. In normal operation, current is generated by the generator 12 and transmitted in a common manner to the electrical system of the motor vehicle. On the other hand, the control device 14 can be influenced by means of a control current circuit 16 in such a manner that the field coils of the generator 12 are poled in a reverse manner, so as to operate the generator as an eddy current brake for generating heat which immediately is transmitted to the cooling liquid.

Seven switches 17,18,19,20,21,22 and 23 are disposed consecutively with respect to each other in the current circuit 16 and are shown in their opened position. The switch 17 is directly connected with battery 15 and is closed by an electromagnet 24 when the battery 15 has sufficient capacity for the electrical consumers in the motor vehicle. The switch 18 is connected with the gear shift lever 25 of the gear drive and is closed by an electromagnet 26 when a low gear, as for example, the first or the second gear are actuated. The switch 19 is connected with the gas pedal 27 or a rod system which leads to the control device of the combustion engine 1. Switch 19 is actuated by an electromagnet 28 which has a built-in delay so that the switch 19 is closed under normal operating conditions and is only opened at preselected acceleration by a firm and substantial depression of the gas pedal. The switch 20 is under the influence of a visual revolution indicating control 29 and is closed by an electromagnet 30 when the number of rotation of the combustion engine 1 is lower by about a third of the highest number of revolutions. The switch 21 is connected with a temperature sensor 32 by means of a line 31, and the temperature sensor is mounted in the cylinder block of the combustion engine, and is closed by an electromagnet 33 when the operating temperature of the combustion engine falls below 85° C., for example. The switch 22 is connected with a temperature sensor 34 and is closed by an electro-magnet 35, when the ambient temperature has dropped to value which requires heating of the passenger cabin. The switch 23 is connected by means of a line 36 with a heat control 37 which is disposed in the supply line 9 and is closed by an electromagnet 38, when the heating control 37 is open due to heat requirement in the passenger cabin.

At a closed control current circuit 16, switch 82,82' or 94 is electromagnetically closed, as for example, whereby the switch is disposed in the control device 14 and through which the generator 12, as described later, is reversed in its polarity into an eddy current brake. Therefore, additional heating through the eddy current brake takes place only when the current circuit 16 is closed, that is, when the aforementioned operating conditions are present with only poor heating capability of the combustion engine 1. Since the eddy current brake assumes a certain load during operation, the combustion engine 1 is accordingly stressed which results in a more rapid heating of the combustion engine 1 itself. However, when the kick down is generated for a preselected acceleration by a firm depression of the gas pedal 25, that is, when the full capacity of the combustion engine is required, the control current circuit 16 is interrupted by switch 19. The eddy current brake is also deactivated or poled to a generator when the other operating conditions deviate from the aforementioned and when one or a plurality of switches 17,18,20,21,22 and 23 are opened.

A circulation pump 39 is provided in the supply line 9, the motor of which is connected to the control device 14 by means of a line 40. The circulation pump 39 is actuated during temporary idling of the combustion engine 1. In this manner, the cooling liquid which serves as a heat carrier is circulated and is fed through the heat exchanger 2, so that the passenger cabin is still heated. When the cooling liquid falls below a certain temperature, the circulation pump 39 is switched off by means of a temperature switch which is now shown in detail, so as to prevent cooling of the combustion engine.

Figure 2:
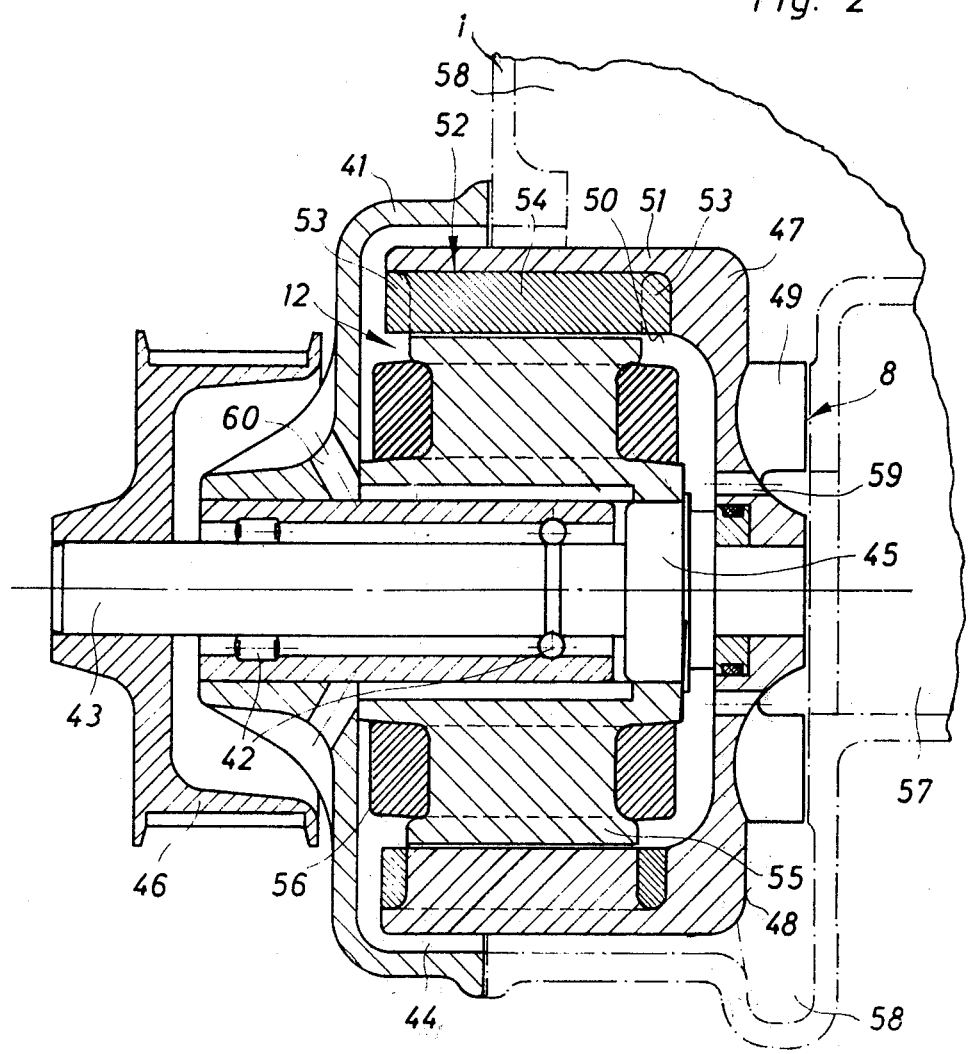
FIG. 2 is an enlarged section through a rotating current generator mounted in the cooling liquid cycle which forms a structural unit together with the cooling liquid pump.

FIG. 2 shows the rotating current-asynchronous generator 12 which is combined with the cooling liquid pump 8 into one structural unit in a pump housing 41 and is directly screwed onto the housing of the combustion engine 1 and extends substantially into its housing. The drive shaft 43 is mounted in pump housing 41 with bearings 42 which is sealed by means of a sealing ring 45 with respect to the inner chamber 44 of pump housing 41 and is rigidly connected with a gear disc 46, for example, by means of a gear belt. A cup shaped rotor 47 is also rigidly mounted on the drive shaft 43, and the rotor supports the blades of the pump wheel 49 of the cooling liquid pump 8 on the radial extending front side 48 facing the housing of the combustion engine 1. On its inner circumferential face 50 of the pipe like jacket 51 extending from pump wheel 49, the rotor 47 receives the short circuited rotor 52 of the rotating current generator. The short circuited rotor 52 is provided with a cage which is formed by two rings 53 and ribs 54 connecting these rings, which consist of copper or aluminum and which are mounted in grooves of the jacket 51 which is made of cast iron or dynamo sheet metal, for example. The short circuited rotor 52 encompasses the coil core 55 with coils 56. The coil core 56 also consists of cast iron or dynamo sheet metal, for example, and is fixedly mounted in pump housing 41. The rotor 47 and the coils 56 are constantly surrounded by cooling liquid which, during the rotating of the rotor, is fed into the hollow chamber 58 of the housing of the combustion engine from the suction chamber 57 into which the cooling liquid line 6 (FIG. 1) discharges. Since, during the rotation, a higher pressure prevails in the hollow chamber 58 than in the suction chamber 57, a constant circumcirculation of the coils 56 and the rotor 47 by the liquid takes place through the inner chamber 44 of the pump housing 41 and through axial bores 59 which are provided in rotor 47, so that the heat which is generated during eddy current operation is fed into the liquid flow. The connections of coils 56 extend through openings 60 in the front face of pump housing 41, which also serves as ventilation bores, and to the control device 14 (FIG. 1).

Figure 3:
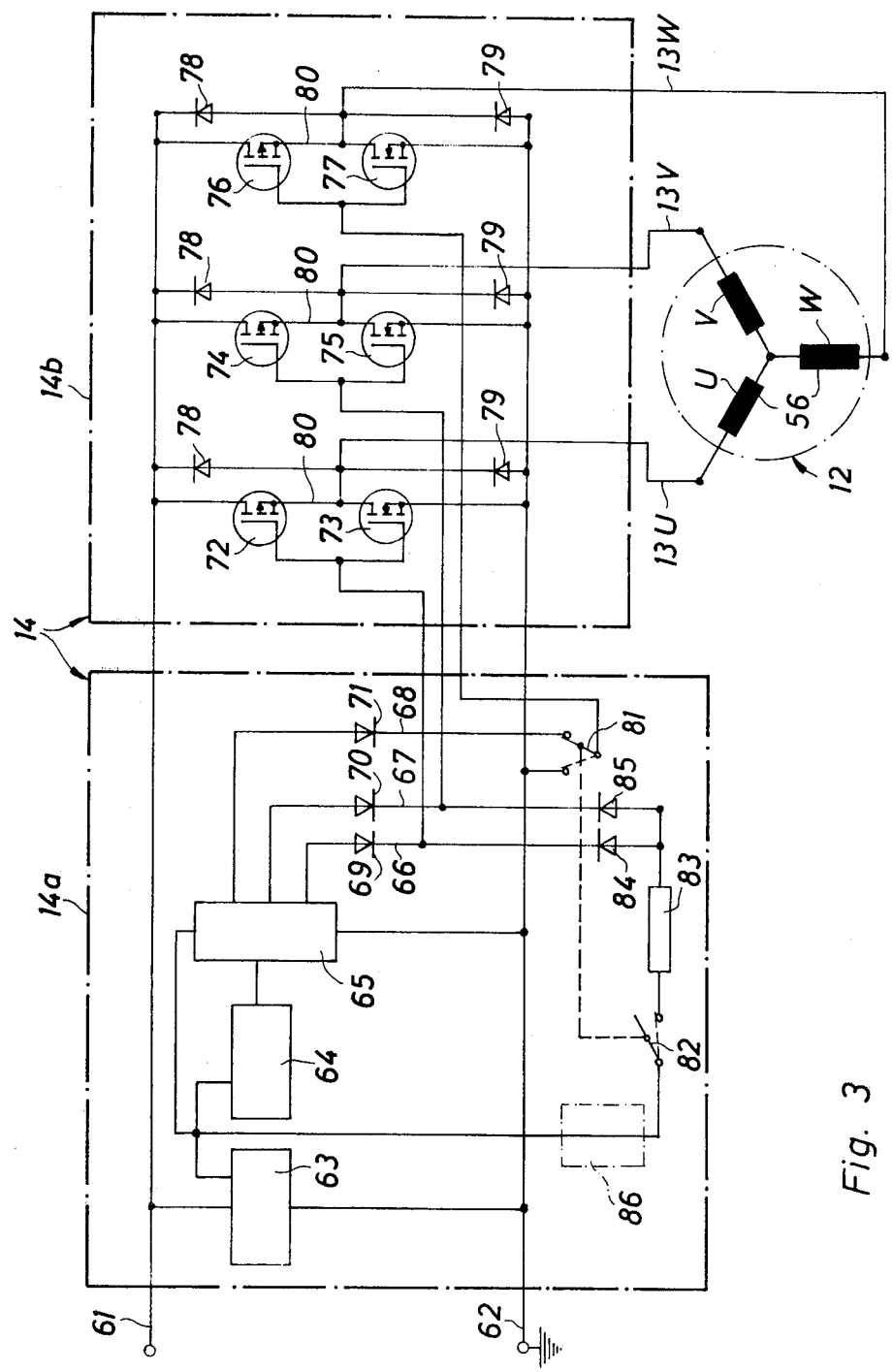
FIG. 3 is a diagram for the coils of a rotating current-asynchronous generator in accordance with a first embodiment.

FIG. 3 shows an exemplified circuit of the control device 14 which enables the illustrated rotating currentasynchronous generator 12 to switch its polarity from its characteristic as a generator for supplying the main current of the motor vehicle into an eddy current brake for heating the cooling liquid. The control device 14 is formed by a control module 14a and a capacity module 14b, with the rotating currentasynchronous generator 12 shown by means of three field coils 56 U,V,W connected with the capacity module 14b through line 13 consisting of three lines 13' U,V,W. The control module 14a and the capacity module 14b are connected to the positive pole by means of a line 61 and to the negative pole of battery 15 by means of a line 62. The control module 14a contains a voltage transformer 63 which supplies a constant voltage of 5 Volt, for example, from the battery. Cycle frequency is generated in an oscillator 64 which is connected to the voltage transformer 63. This cycle frequency is applied to a divider 65 and is distributed in three 120° offset rectangular voltages into three control lines 66,67 and 68 which are connected with the gates of VMOS-transistors 72,73;74,75,76 and 77 by means of diodes 69,70 and 71. Two complimentary VMOS-transistors 72,73;74,75 or 76,77 are provided for each field coil 56 U,V,W of the rotating currentasynchronous generator 12. In this embodiment the field coils 56 U,V,W are switched in form of a star, as shown. The supply lines 13U,13V and 13W are connected with the line 61 or 62, respectively, by means of connecting lines 80 of the two associated transistors and through oppositely acting diodes 78,79. A double throw switch 81 is provided in control line 68 which in the shown position connects the gates of the transistors 76 and 77 with the diode 71. In this position, the field coils 56 U,V,W supply current into the main positive line 61 through diodes 78, while flow is arrested in line 62 by diodes 79 at the positive half wave during the drive of the generator rotor through the combustion engine. In this connection, the exciting current for the rotatingasynchronous generator 12 is supplied through the transistor pairs 72,73;74,75 and 76,77 which convert the direct current of the vehicle battery into a rotating current, which due to the rectangular voltage on the gates of each transistor pair 72,73;74,75 and 76,77 render the transistors of each pair alternately conductive and non-conductive. The illustrated circuit is known (see for example VMOS-transistors, Characteristics and Circuit Examples by Intermetall ITT, Application report 801 by Infratron, Munich) and does not constitute part of this invention.

When the rotating current-asynchronous generator 12 serves as an eddy current brake, switch 81 is brought into the position shown in the dash line causing the gates of the transistors 76 and 77 to connect with the line 62. A further switch 82 is connected with switch 81 which is actuated by the control current circuit 16

(FIG. 1) and is open during generator operation and is closed during the operation of the generator 12 as an eddy current brake (dash line). In this fashion, a direct current is taken from the voltage transformer 63 and is fed through a resistor 83 and diodes 84 and 85 into control lines 66 and 67, causing the transistors 72 and 74 to be constantly conductive, while the transistors 73 and 75 are constantly non-conductive, whereby the field coils U and V are supplied with direct current which can flow through field coil W and through the conductive transistor 72 to the line 62. The transistor 76 is non-conductive, since its gate is applied to the potential of this line.

During the rotation of the short circuited rotor 52 (FIG. 2), the rods 54 cut the lines of the magnetic fields generated by the field coils 56 U,V',W, whereby eddy currents are induced in rods 54 which generate heat which is discharged through the inner chambers 44 by the liquid as heretofore described.

In order to keep the exciting current by the field coils 56 U,V,W low, a cycled direct current may be used for the control current for the transistors which is generated by means of a cycle oscillator 86. Thereby a blind resistance is generated in the field coils in addition to the Ohm resistance which limits the exciting current. The cycle frequency of the cycle oscillator 86 can be substantially larger than the frequency of the oscillator 64.

Figure 4:
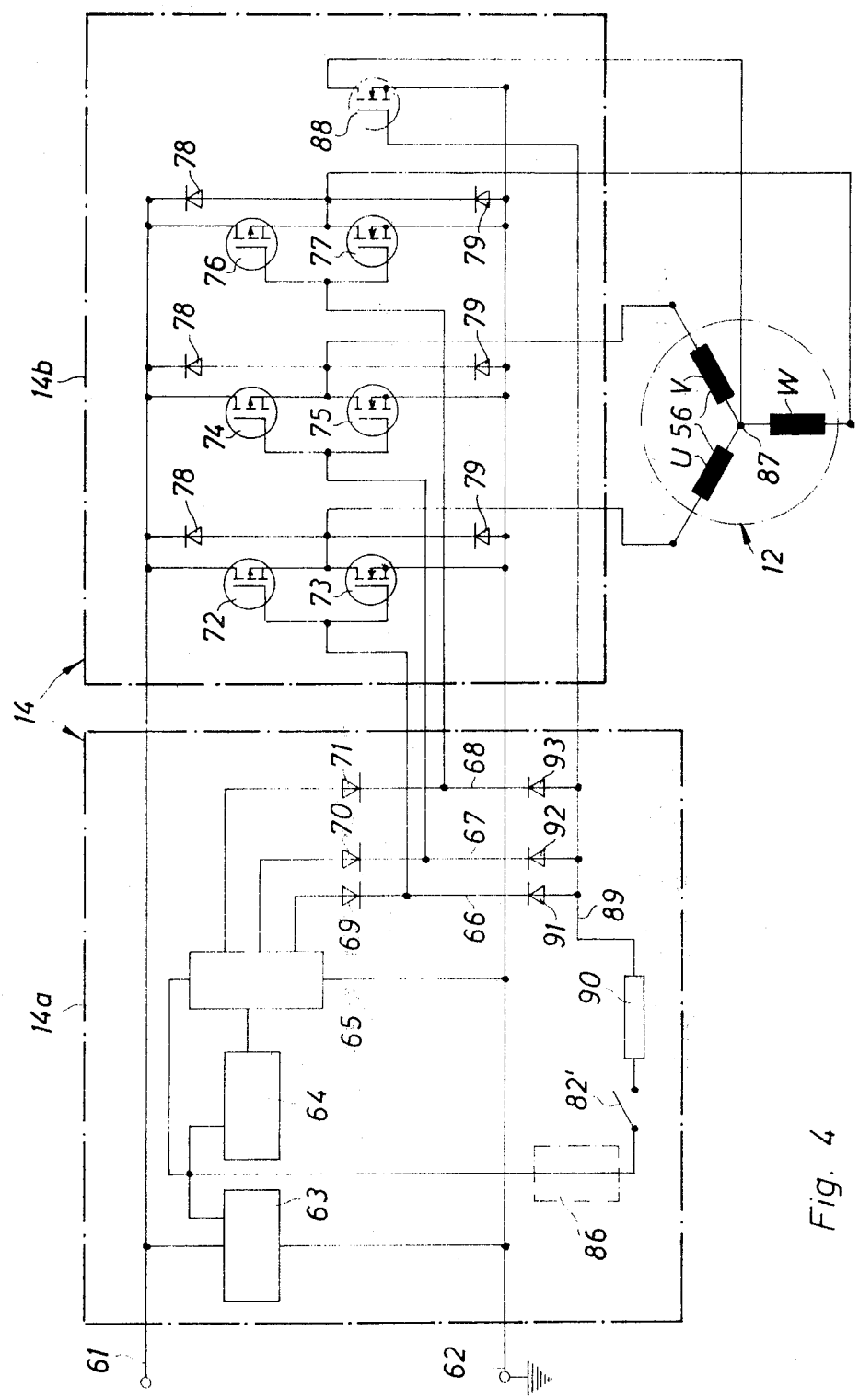
FIG. 4 is a similar diagram for the coils of a rotating current-asynchronous generator in accordance with a second embodiment, and FIG. 5 a diagram of a third embodiment, however, for the coils of a direct current excited rotating current generator.

A block diagram is shown in FIG. 4 which differs essentially from the block diagram of FIG. 3 in that the star point 87 of the field coils U,V,W is coupled through a VMOS-transistor 88 with the negative line 62. The gate of this transistor 88 is connected through line 89, resistor 90 and switch 82' with the output clamp of the voltage transformer 63. Furthermore, the gates of the transistors 72 to 77 are connected with line 89 by means of diodes 91,92 and 93.

The rotating current-asynchronous generator 12 supplies current into the main when the switch 82' is in an open position. When the switch 82' is closed, the transistor 88 is rendered conductive, so that the star point 87 is connected with the line 62, The gates of the transistors 72 to 77 are controlled by diodes 91,92 and 93 in such a manner that the first transistors 72,74 and 76 are always conductive and the second transistors 73,75 and 76 are always non-conductive. Consequently, the field coils 56 U,V,W are always admitted by direct current and eddy currents are induced in the rods of the short circuited rotor in the manner heretofore described. In this case, a cycle oscillator 86 can be switched on, so as to limit the current flow through the field coils 56 U,V,W.

Figure 5:
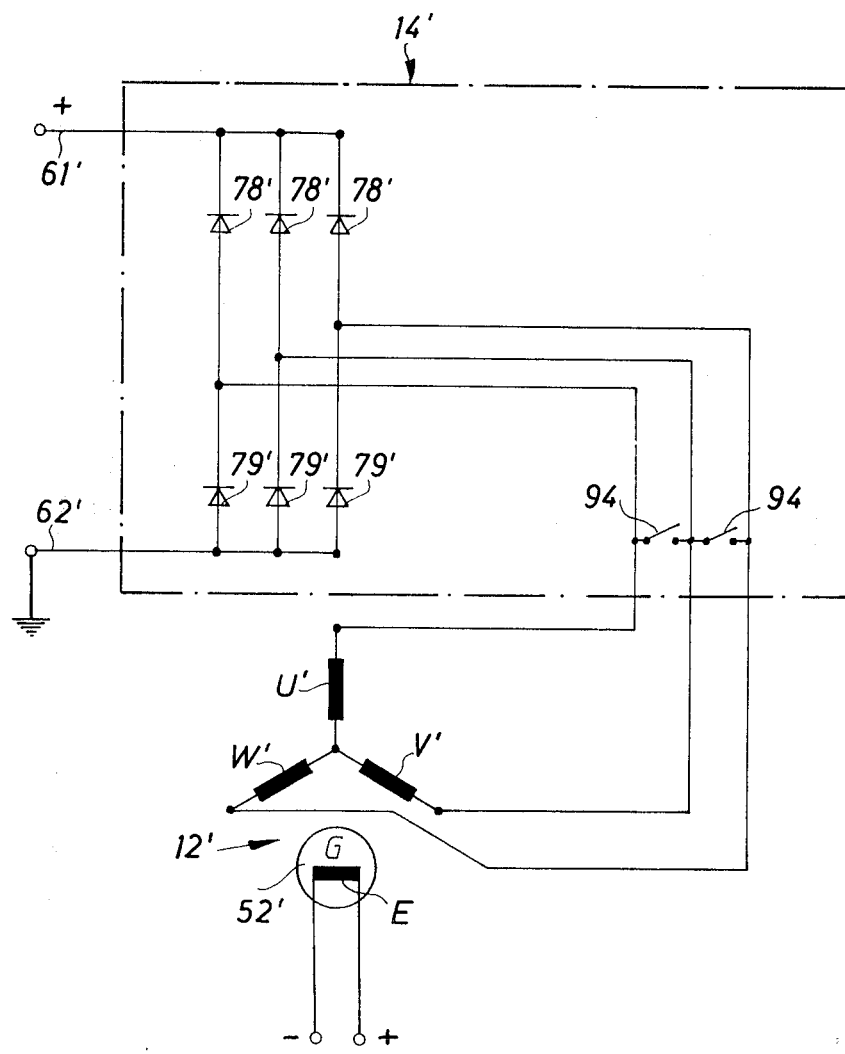

FIG. 5 shows a block diagram for a direct current excited rotating current generator 12' whose field coils are designated U',V' and W' and whose exciting winding is designated with E. During normal operation, an alternating current is induced during the rotation of the rotor 52' in field coils U', V',W' which is fed through the diodes 78' and into the plus line 61', while a discharge flow through diodes 79' into line 62 is prevented. In order to use this direct current excited rotating current generator as an eddy current brake, the field coils U', V',W' can be short circuited by means of switches 94. These switches 94 are commonly actuated in the same manner as switches 82,82', respectively, heretofore described. The switches 82,82' and 94 may also be connected with the brake pedal of the motor vehicle, so that the generator may be used as an additional vehicle brake. This is advantageous in that when driving downhill an ensuing cooling off of the cooling liquid is reduced, for example.

While the short circuited rods 54 are provided in the rotor 47 in the exemplified embodiment of FIG. 2, an alternative embodiment is feasible wherein these rods are disposed in the stator, that is, in the coil core 55. For this purpose, it is required that the rotor 47 is provided a gear with teeth disposed parallel to the rotating axis on its jacket face 50, so as to generate a pulsating magnetic field. The advantage of such an arrangement is that the rotor 47 has merely a magnetic field guiding function and does not run in liquid as shown in the embodiment in accordance with FIG. 2, so that mixing losses are prevented. The cooling or heating liquid, respectively, can be exclusively fed through the stationary stator, whereby the feeding rods are hollow, in known manner, and are admitted by the liquid.

Thereby, the rotor may be formed by any part driven by the combustion engine, for example, by the flywheel.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A motor vehicle provided with a combustion engine, an alternator, a battery and a heating installation for the passenger cabin having a heating unit which comprises a heating circuit and a heating exchanger fed by the heating liquid for the heating of air;

the alternator being liquid cooled and having a rotor and chambers adapted to receive cooling liquid and being switchable into the heating circuit, the alternator having field coils; and means to short circuit the field coils switching the alternator into an eddy current brake.

2. A motor vehicle in accordance with claim 1, wherein the alternator is a liquid cooled alternator asynchronous generator, whereby its chambers which are cooled by the cooling liquid are switched to the heating circuit, a semiconductor circuit is provided for generating the exciting current for the coils of the alternator synchronous generator from the vehicle battery, this circuit being provided with two oppositely operating semiconductor circuits for each of the coils, of which the first semiconductor is disposed between the coil and the positive pole and the second semiconductor is disposed between the coil and negative pole, whereby selectively, (a) the control current for the two semiconductor circuits is an alternating circuit associated with each one coil, which is generated from the battery direct current flow by an oscillator, a divider coupled therewith for generating at least three electric control voltages, one for each coil, which are electrically offset by about 120°, so that the first semiconductor circuit and the second semiconductor circuit are alternating conductive and non-conductive, (b) the control current for the first semiconductor circuit is a direct current frequency, while the control current for the second semiconductor current is zero, so that all first semiconductor circuits are conductive and all second semiconductor circuits are non-conductive, and, alternatively, that at least two of the first semiconductors and at least one of the second semiconductors are conductive.

3. A motor vehicle in accordance with claim 1, wherein the alternator is a liquid cooled alternator asynchronous generator, the alternator chambers adapted to receive the cooling liquid and being switchable into the heating circuit, a semiconductor circuit for generating the exciting current for the coils of the alternator-asynchronous generator from vehicle battery and provided with two opposite operating semiconductors for each coil, of which one is disposed between the coil and the positive pole and the other is disposed between the coil and negative pole, the control current for the semiconductor is an alternating current provided from the battery direct current by means of an oscillator with a divider coupled therewith for generating at least three control voltages which are electrically offset by about 120° for each coil, so that the two semiconductor circuits associated with each one coil are alternately conductive and non-conductive, the connections of two coils are switchable for the purpose of reversing the rotating field.

4. A motor vehicle in accordance with claim 1 wherein the alternator comprises structural parts for conducting a magnetic field, said structural parts being made of a ferromagnetic material.

5. A motor vehicle in accordance with claim 1 further comprising a cooling system for cooling the liquid, and a pump for feeding the liquid through the heating circuit as well as through the cooling system mounted on the rotor of the alternator.

6. A motor vehicle in accordance with claim 3 wherein the semiconductor circuit comprises V-MOS transistors.

7. A motor vehicle in accordance with claim 1 wherein the coils of the alternator are switched for generating the eddy currents when a current circuit fed through the ignition switch is closed, wherein a first switch is provided, which is closed at a low outer temperature, a second closed switch is provided which is closed at a low liquid temperature, a third switch is provided which is closed at a partial load of the combustion engine, a fourth switch is provided which is closed at a low number of rotations, a fifth switch is provided which is closed at a low gear of the gear drive, a sixth switch is provided which is closed during heat requirement in the passenger cabin, and a seventh switch is provided which is closed during a sufficient emission at a sufficient capacity of the battery.

8. A motor vehicle in accordance with claim 7 wherein the first switch is connected with a temperature scanner which scans the outer temperature, the second switch is connected with a temperature sensor on the combustion engine, the third switch is connected with the gas pedal for the combustion engine, the fifth switch is connected with the gear shift and the seventh switch is connected with the battery.

9. A motor vehicle in accordance with claim 7 wherein the fourth switch is in connection with the circuit breaker for monitoring the number of revolutions.

10. A motor vehicle in accordance with claim 7 wherein the fourth switch is connected to the injection pump for monitoring the number of revolutions.

11. A motor vehicle in accordance with claim 7 wherein the switches are actuated by electro-magnets.

12. A motor vehicle in accordance with claim 7 wherein a pump wheel is mounted on the rotor for feeding the liquid through the heating circuit.

* * * * *